US011853575B1

(12) United States Patent
Patil et al.

(10) Patent No.: US 11,853,575 B1
(45) Date of Patent: Dec. 26, 2023

(54) METHOD AND SYSTEM FOR DATA CONSISTENCY ACROSS FAILURE AND RECOVERY OF INFRASTRUCTURE

(71) Applicant: Veritas Technologies LLC, Santa Clara, CA (US)

(72) Inventors: Rushikesh Patil, Maharashtra (IN); Vishal Thakur, Maharashtra (IN); Sunil Hasbe, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/836,288

(22) Filed: Mar. 31, 2020

Related U.S. Application Data

(60) Provisional application No. 62/859,092, filed on Jun. 8, 2019.

(51) Int. Cl.
*G06F 3/06* (2006.01)
*G06F 11/14* (2006.01)

(52) U.S. Cl.
CPC .......... *G06F 3/0641* (2013.01); *G06F 3/064* (2013.01); *G06F 3/065* (2013.01); *G06F 3/0619* (2013.01);
(Continued)

(58) Field of Classification Search
CPC .... G06F 11/1004; G06F 3/0619; G06F 3/064; G06F 3/0659; G06F 3/0673; G06F 12/00
See application file for complete search history.

(56) References Cited

U.S. PATENT DOCUMENTS

| 5,649,152 A | 7/1997 | Ohran et al. | G06F 12/00 |
| 5,835,953 A | 11/1998 | Ohran | G06F 12/16 |

(Continued)

FOREIGN PATENT DOCUMENTS

| CN | 109154905 | 1/2019 |
| JP | 2020047107 | 3/2020 |
| WO | WO 2017/014814 | 1/2017 |

OTHER PUBLICATIONS

PCT International Written Opinion and Search Report of the International Searching Authority for Application No. PCT/US2021/015379 dated May 12, 2021, 12 pages.

(Continued)

*Primary Examiner* — Eric Cardwell
(74) *Attorney, Agent, or Firm* — Womble Bond Dickinson (US) LLP

(57) ABSTRACT

A method and system for data consistency across failure and recovery of infrastructure. In one embodiment of the method, copies of first data blocks stored in a source memory are sent to a target site via a data link. While sending one or more of the copies of the first data blocks to the target site, source hashes for second data blocks stored in the source memory are calculated, wherein the first data blocks are distinct from the second data blocks. While sending one or more of the copies of the first data blocks to the target site, target hashes of data blocks stored in a target memory of the target site are received. While sending one or more of the copies of the first data blocks to the target site, the source hashes are compared with the target hashes, respectively. After sending the first data blocks to the target site via the data link, copies of only those second data blocks are sent to the target site with source hashes that do not compare equally with respective target hashes.

15 Claims, 8 Drawing Sheets

(52) U.S. Cl.
CPC .......... *G06F 3/0659* (2013.01); *G06F 3/0673* (2013.01); *G06F 11/1453* (2013.01); *G06F 11/1469* (2013.01)

(56) References Cited

U.S. PATENT DOCUMENTS

| | | | |
|---|---|---|---|
| 5,875,479 | A | 2/1999 | Blount et al. ........... G06F 12/16 |
| 5,915,098 | A | 6/1999 | Palmer et al. .......... G06F 13/00 |
| 6,073,222 | A | 6/2000 | Ohran ..................... G06F 12/00 |
| 6,085,298 | A | 7/2000 | Ohran ..................... G06F 12/16 |
| RE37,601 | E | 3/2002 | Eastridge et al. ...... G06F 11/00 |
| 6,728,898 | B2 | 4/2004 | Tremblay et al. ...... G06F 11/00 |
| 6,732,245 | B2 | 5/2004 | Kaiya et al. ............ G06F 12/00 |
| 6,779,093 | B1 | 8/2004 | Gupta ..................... G06F 12/06 |
| 7,103,796 | B1 | 9/2006 | Kekre et al. ........... G06F 11/00 |
| 7,386,752 | B1 | 6/2008 | Rakic et al. |
| 7,987,368 | B2 | 7/2011 | Zhu |
| 8,577,850 | B1 | 11/2013 | Genda ..................... G06F 17/30 |
| 8,874,508 | B1 | 10/2014 | Mittal ..................... G06F 17/00 |
| 9,087,088 | B1 | 7/2015 | Bose |
| 9,442,806 | B1 | 9/2016 | Bardale .................. G06F 17/30 |
| 9,509,697 | B1 | 11/2016 | Salehpour |
| 9,575,789 | B1 | 2/2017 | Rangari |
| 9,740,422 | B1 | 8/2017 | Ozdemir ............... G06F 3/0641 |
| 10,394,485 | B1* | 8/2019 | Chen ....................... G06F 3/061 |
| 10,496,494 | B1 | 12/2019 | Haloi ...................... G06F 16/00 |
| 10,592,149 | B1 | 3/2020 | Jenkins ................... G06F 3/06 |
| 2003/0014433 | A1 | 1/2003 | Teloh et al. ............. G06F 12/00 |
| 2003/0061366 | A1 | 3/2003 | Musante et al. ........ G06F 15/16 |
| 2003/0126388 | A1 | 7/2003 | Yamagami .............. G06F 13/00 |
| 2003/0158869 | A1 | 8/2003 | Micka ..................... G06F 12/00 |
| 2004/0049365 | A1 | 3/2004 | Keller et al. |
| 2007/0185937 | A1 | 8/2007 | Prahlad et al. ......... G06F 17/30 |
| 2008/0279204 | A1 | 11/2008 | Pratt, Jr. |
| 2009/0187923 | A1 | 7/2009 | McKinney |
| 2010/0070447 | A1 | 3/2010 | Pfunter et al. |
| 2010/0169720 | A1 | 7/2010 | Lumpp et al. |
| 2011/0126099 | A1 | 5/2011 | Anderson et al. |
| 2012/0259825 | A1* | 10/2012 | Tashiro ............... G06F 16/1752 707/698 |
| 2013/0054523 | A1* | 2/2013 | Anglin ................... G06F 16/27 707/624 |
| 2015/0169613 | A1* | 6/2015 | Bshara .................... G06F 16/27 707/692 |
| 2015/0278395 | A1 | 10/2015 | Ben Jemaa ........ G06F 16/9024 |
| 2015/0280999 | A1 | 10/2015 | Chart et al. |
| 2016/0306560 | A1 | 10/2016 | Maranna et al. ......... G06F 3/06 |
| 2016/0371007 | A1 | 12/2016 | Shani ..................... G06F 3/065 |
| 2017/0286690 | A1 | 10/2017 | Chari |
| 2017/0289187 | A1 | 10/2017 | Noel |
| 2017/0300244 | A1 | 10/2017 | Crawford et al. .... G06F 3/0619 |
| 2018/0109425 | A1 | 4/2018 | Chart et al. |
| 2018/0285201 | A1 | 10/2018 | Bangalore ............... G06F 11/14 |
| 2018/0295029 | A1 | 10/2018 | Shivaana |
| 2019/0138995 | A1 | 5/2019 | Currin |
| 2020/0097198 | A1 | 3/2020 | Bansal ..................... G06F 3/06 |

OTHER PUBLICATIONS

PCT International Written Opinion and Search Report of the International Searching Authority for Application No. PCT/US2021/015384 dated Apr. 13, 2021, 12 pages.

Bandopadhyay, Tushar et al.; "System and Method to Propagate Information Across a Connected Set of Entities Irrespective of the Specific Entity Type"; U.S. Appl. No. 15/857,577, filed Dec. 28, 2017; consisting of Specification, Claims, Abstract, and Drawings; 46 pages.

Bandopadhyay, Tushar et al.; "Method and System for Dependency Analysis of Workloads for Orchestration"; U.S. Appl. No. 15/844,359, filed Dec. 15, 2017; consisting of Specification, Claims, Abstract, and Drawings; 77 pages.

Patil, Rushikesh et al.; "Methods and Systems for Data Resynchronization in a Replication Environment"; U.S. Appl. No. 16/805,294, filed Feb. 28, 2020; consisting of Specification, Claims, Abstract, and Drawings; 67 pages.

Patil, Rushikesh Patil et al.; "Methods and Systems for Data Resynchronization in a Replication Environment"; U.S. Appl. No. 16/805,292, filed Feb. 28, 2020; consisting of Specification, Claims, Abstract, and Drawings; 49 pages.

Zhang, Shuangmin et al.; "Optimize Backup from Universal Share"; U.S. Appl. No. 16/835,657, filed Mar. 31, 2020; consisting of Specification, Claims, Abstract, and Drawings; 28 pages.

Alferes, Jose Julio et al.; "Chapter 3—Evolution and Reactivity in the Semantic Web"; F. Bry and J. Maluszynski (Eds.): Semantic Techniques for the Web; Lecture Notes in Computer Science—5500; Sep. 29, 2009; pp. 161-200.

Deng, Li et al., "vMerger: Server Consolidation in Virtualized Environment," 2013 IEEE 11th Int'l Conference on Dependable, Autonomic and Secure Computing, pp. 606-612.

PCT International Written Opinion and Search Report of the International Searching Authority for Application No. PCT/US2021/024850 dated Aug. 2, 2021, 14 pages.

EP Application No. 18 707 994.2-1224, EP Examination Report dated Sep. 6, 2021, 9 pages.

* cited by examiner

METHOD AND SYSTEM FOR DATA CONSISTENCY ACROSS FAILURE AND RECOVERY OF INFRASTRUCTURE

CROSS-REFERENCE TO RELATED APPLICATIONS

This application claims the domestic benefit under Title 35 of the United States Code § 119(e) of U.S. Provisional Patent Application Ser. No. 62/859,092, entitled "Method and System for Data Consistency Across Failure and Recovery of Infrastructure," filed Jun. 8, 2019, which is hereby incorporated by reference in its entirety and for all purposes as if completely and fully set forth herein.

BACKGROUND

Data replication is the process of storing the same data in multiple sites (e.g., at production/source site and at a disaster recovery (DR)/target site) to improve system resilience and reliability. Replication involves copying data from the production/source site to the DR/target site. Data can be copied on demand or be transferred in bulk or in batches according to a schedule, or be replicated in real time as the data is written, changed, or deleted at the production/source site. If the production/source site goes down due to faulty hardware, malware attack or other problem, or if the production/source site is scheduled for maintenance, the DR/target site can takeover operations normally performed by the production/source site without much interruption to clients.

SUMMARY

A method and system for data consistency across failure and recovery of infrastructure. In one embodiment of the method, copies of first data blocks stored in a source storage are sent to a target site via a data link. While sending one or more of the copies of the first data blocks to the target site, source hashes for second data blocks stored in the source storage are calculated, wherein the first data blocks are distinct from the second data blocks. While sending one or more of the copies of the first data blocks to the target site, target hashes of data blocks stored in a target storage of the target site are received. While sending one or more of the copies of the first data blocks to the target site, the source hashes are compared with the target hashes, respectively. After sending the first data blocks to the target site via the data link, copies of only those second data blocks are sent to the target site with source hashes that do not compare equally with respective target hashes.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
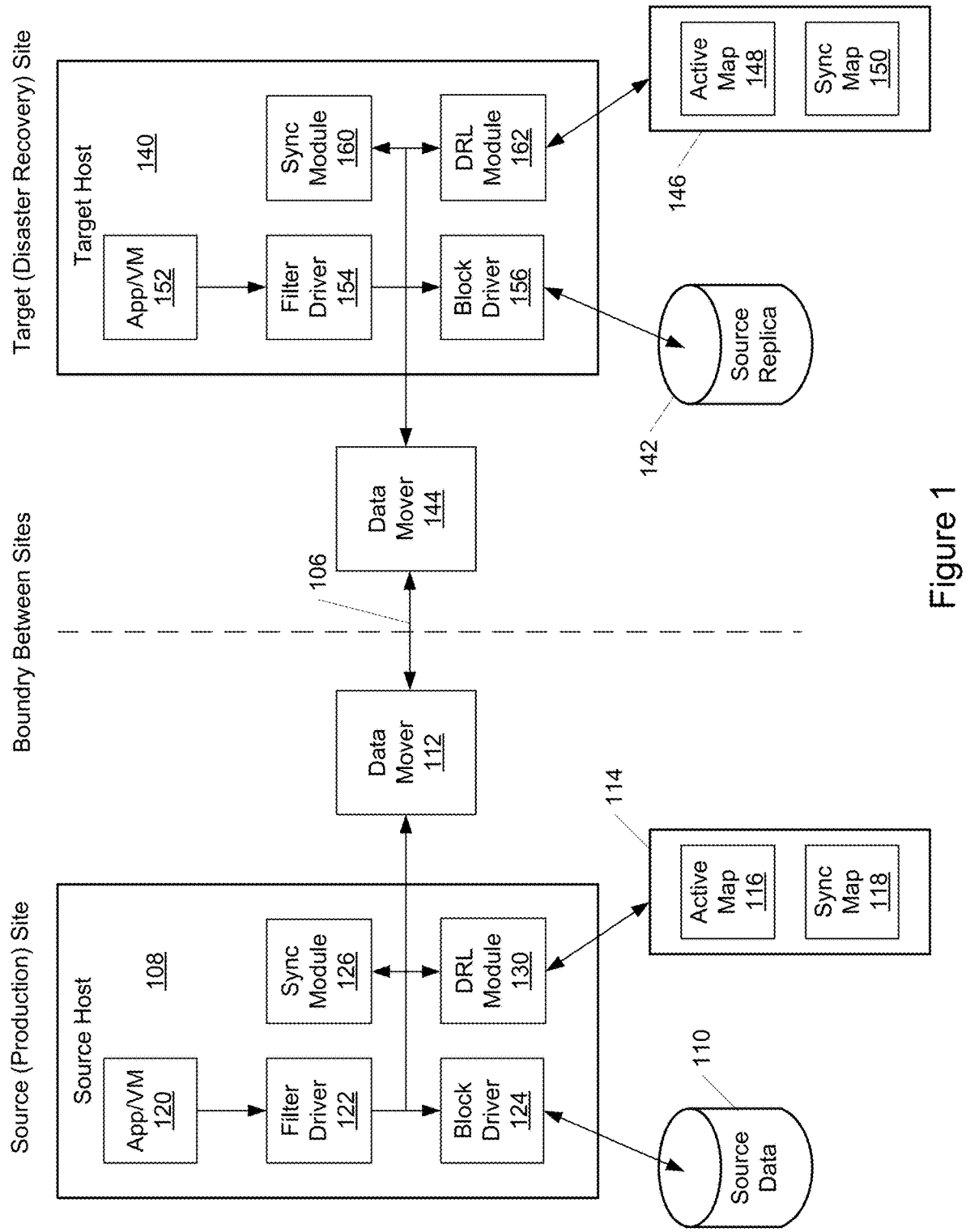
FIG. 1 is a simplified block diagram illustrating an example of an system employing one embodiment of the present disclosure.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DETAILED DESCRIPTION

FIG. 1 illustrates a production/source site 102 in data connection with DR/target site 104 via data link 106 (e.g., the Internet). The source site 102 can receive, process and respond to transaction requests from client computer systems (not shown). Source site 102 includes a source storage or memory (e.g., storage area network) 110, which stores source data in logical data blocks. DR/target site 104 includes a target memory or storage (e.g., storage area network) 142 that can store a replica of the source data. Target site 104 is normally in standby mode. Target site 102 can takeover operations when source site is unavailable to clients for any number of reasons including failure of infrastructure, possible data corruption after the detachment and reattachment of storage disks within storage 110, scheduled maintenance, etc. During takeover target site 102 receives, processes and responds to transaction requests from client computer systems. While processing the transaction requests, target site 102 updates the source replica stored in storage 142. These updates may not be replicated back to source site 102. As a result, the source data in storage 110 and the updated source replica in storage 142, are out of synchronization. Operations can eventually fallback to source site 102 after some time. Before source site 102 can resume responding to transaction requests from client computer systems, however, source data in storage 110 should be synchronized or resynchronized to the updated replica in target storage 142.

Figure 2A:
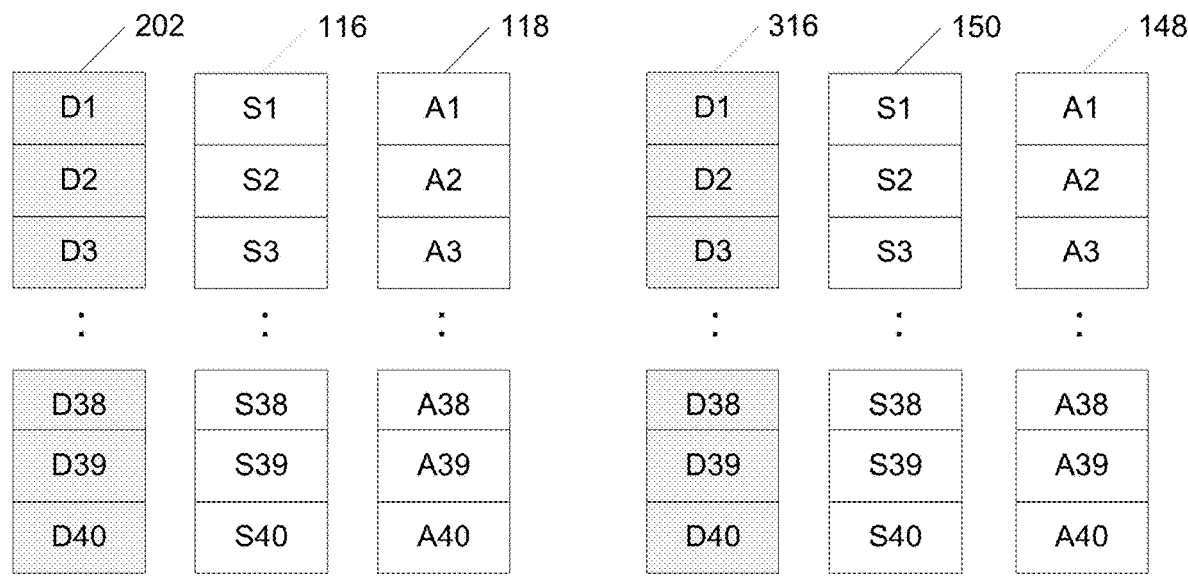
FIGS. 2*a* and 2*b* are graphical representations of data and bit maps employed in the system of FIG. 1.

Source site 102 includes one or more source hosts (e.g., servers) that receive and process transaction requests from client computer systems. For purpose of explanation only, the present disclosure will be described with reference to a single source host 108, it being understood the present disclosure should not be limited. Source host 108 is in data communication with a source storage 110, which stores source data in contiguous logical data blocks identified by number. Source host 108 is also in communication with data mover (e.g., replication appliance) 112, and map memory 114, which includes source active and synchronization maps 116 and 118, respectively, which will be more fully described below. Host 108 includes at least one real application or virtual machine (App/VM) 120 executing on one or more processors (not shown). App/VM 120 generates I/O transactions to update data blocks of source data in source storage 110 in response to receiving transaction requests from client computer systems. FIG. 2a illustrates a graphical representation of source data 202, which consists of a plurality of contiguous, logical data blocks of equal size. For ease of illustration and description, source data 202 is presumed to include 40 logical data blocks, it being understood the present disclosure should not be limited to that number. FIG. 2a also shows synchronization and active maps 116 and 118, respectively. Each of these maps includes one bit entries corresponding to respective data blocks of source data 202. Initially, each entry of the maps are set to logical 0. When set to logical 1, a map entry may indicate that it's corresponding logical data block in source data 202 has been updated. Source host 108 further includes filter and block drivers 122 and 124, in addition to synchronization and dirty region logging (DRL) modules 126 and 130, respectively. Each of the components 122-130 may take form in software executing on one or more processors of source host 108. Moreover, each of the components 122-130 is in data communication with each other and data mover 112.

Target site 104 includes target host 140 (e.g., a server) in data communication with a target storage 142 that can store a replica of the source data 202. Target host 140 is in data communication with data mover (e.g., replication appliance) 144, and map memory 146, which includes active and synchronization maps 148 and 150, respectively, which will be more fully described below. Host 140 includes App/VM 152 that is similar to App/VM 120. When activated during a takeover, App/VM 152 generates I/O transactions to update data in blocks of the source replica in storage 142 in response to receiving and processing transaction request from client computer systems. Target host 140 further includes filter and block drivers 154 and 156, in addition to synchronization and DRL modules 160 and 162, respectively. Each of the components 154-162 may take form in software executing on one or more processors of target host 140. Moreover, each of the components 154-162 is in data communication with each other and data mover 144.

Figure 3:
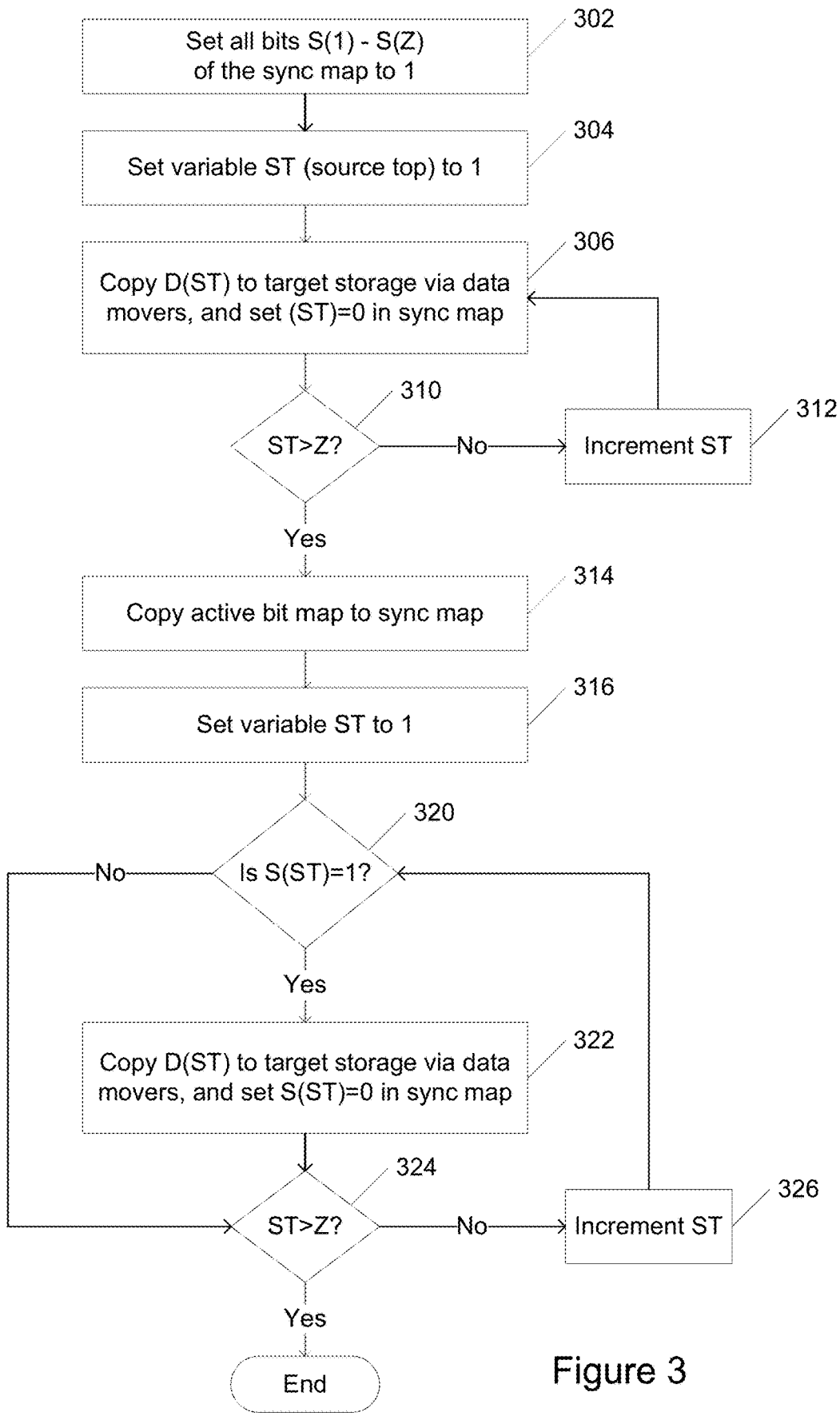
FIG. 3 is a flow diagram illustrating relevant aspects of a process for migrating data.

As noted above target site 104 can takeover for source site 102 for any one of many different reasons. Before target site 104 can takeover for source site 102 for the first time, a copy of source data in source storage 110 must be created in target storage 142. FIG. 3 illustrates relevant aspects of the process of migrating source data 202 to target storage 142 to create the copy. With continuing reference to FIGS. 1 and 2a, FIG. 3 shows the process beginning with synchronization module 126 setting all bits of synchronization map 116 to logical 1 via DRL module 130. Thereafter, in step 304, synchronization module 126 sets a variable ST=1. In step 306 a copy of data in block ST (i.e., D(ST)) of source data 202 is sent to and stored in target storage 142 via data movers 112 and 144. Bit S(ST) in synchronization map 116 is then set to logical 0 to indicate D(ST) has been copied to target storage 142. Thereafter, synchronization module 126 compares variable ST with Z, which is the total number of data blocks within source data 202. If ST is less than Z, which equals 40 in the illustrated example, synchronization module 126 increments ST, and process step 306 is repeated for the next data block in source data 202. Importantly, if source data 202 is large, steps 306-312 may take a long time.

As the source data 202 is being migrated block-by-block to target storage 142 during steps 306-312, App/VM 120 may concurrently issue I/O transactions for updating blocks of data in source data 202. Filter driver 122 taps the I/O transactions received from App/VM 120 as these I/O transactions are forwarded to block driver 124. The I/O transaction should identify the logical block number N (or numbers N-M) or include information that can be used to identify the logical block number N (or numbers N-M) within source data 202 that will be updated by the I/O transaction. For ease of illustration, the present disclosure will be described with reference to I/O transactions that update one block of data at a time. Filter driver 122 can set the appropriate bit (i.e., A(N)) in active map 118 that corresponds to the logical data block N identified in each I/O transaction that is tapped during steps 306-312.

The updates to source data 202 during steps 306-312, should be replicated to target storage 142 after migration process steps 306-312 are complete. To that end synchronization module 126 copies the contents of active map 118 to synchronization map 116 as shown in step 314. Synchronization module 126 resets variable ST=1 in step 316. In step 320, synchronization module 126 accesses synchronization map 116, to read synchronization bit S(ST). If this bit is set to logical 1 then in step 322, data D(ST) is copied from source data 202 to target storage 142 via data movers 112 and 114. Then, the synchronization module 126 clears the synchronization bit S(ST) to logical 0 in the synchronization map 116. Synchronization module 126 then compares variable ST to Z, the total number of data blocks in source data 202 as shown in step 324. If ST is less than Z, synchronization module 126 increments ST and synchronization bit S(ST) is read from the synchronization map 116 for analysis in step 320. If, however, ST is greater than Z in step 324, the process ends, and contents of target storage 142 will be consistent with source data 202.

FIG. 2a illustrates replicated source data 204 in target storage 142 after the migration process of FIG. 3 has completed. Replicated source data 204 consists of a plurality of contiguous, logical data blocks of equal size. The size and number of logical data blocks in replicated source data 204 equals the size and number of logical data blocks in source data 202. Data blocks D1-D40 in source data 202 correspond to data blocks D1-D40, respectively, in replicated source data 204. Each data block Dx in source data 202 and replicated source data 204 is located at the same offset from the beginning of source and replicated source data 202 and 204, respectively.

Figure 4:
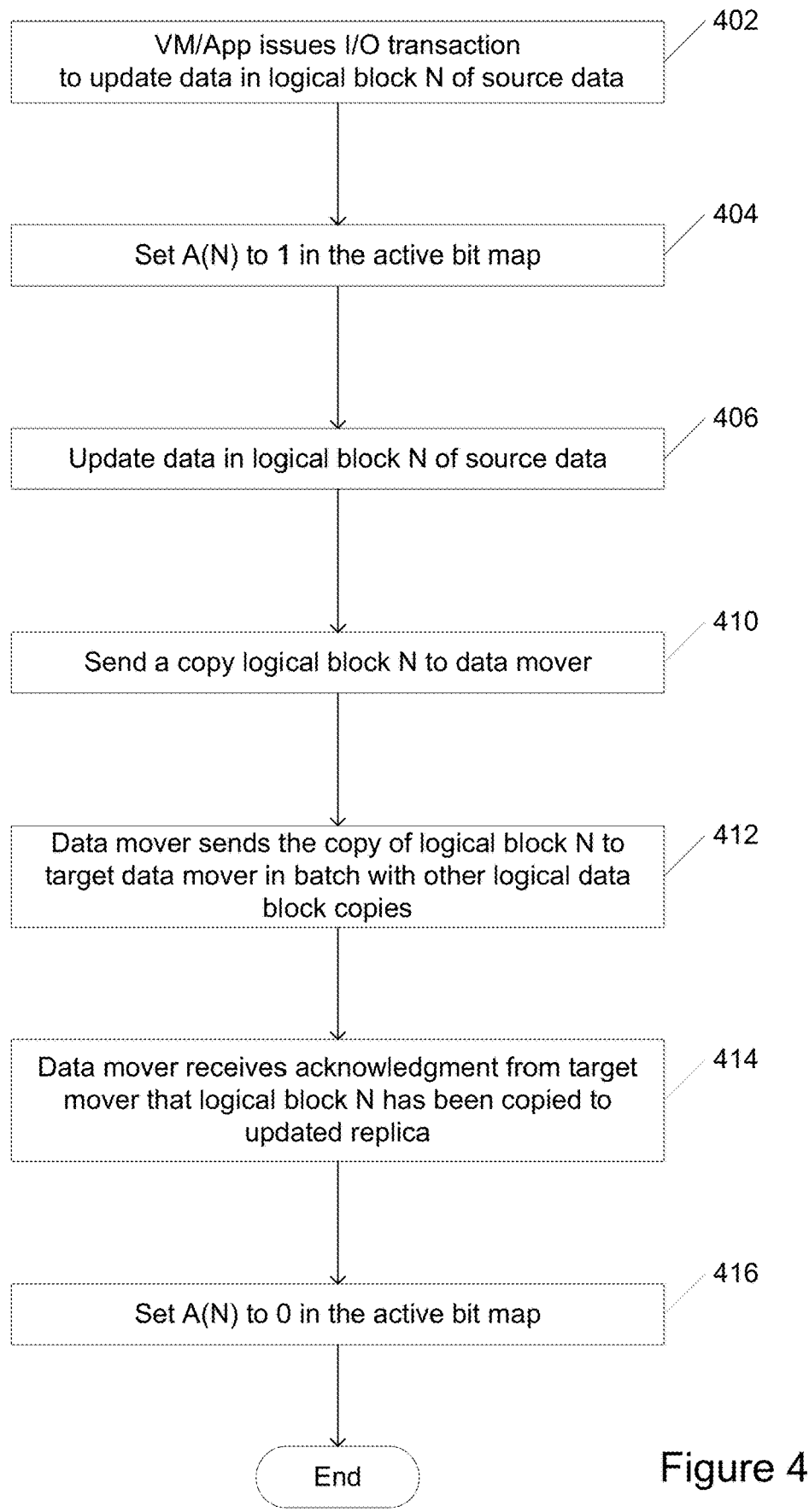
FIG. 4 is a flow diagram illustrating relevant aspects of a process for replicating updates to data.

App/VM 120 continues to issue I/O transactions to update source data 202 after the migration process of FIG. 3. Any changes to data store 202 should be replicated to target storage 142 in order to maintain consistency between sites 102 and 104. Source site 102 acting in cooperation with target site 104 can replicate changes to source data 202 as they occur. With continuing reference to FIGS. 1 and 2a, FIG. 4 illustrates an example of this process in greater detail. The process of FIG. 4 begins with step 402 when App/VM 120 generates a transaction to update data in block N of source data 202. Filter driver 122 taps the I/O transaction as it is sent to block driver 124. Active map 118 is updated using the tapped I/O transaction. More particularly, DRL module 130 sets the appropriate bit (i.e, A(N)) to logical 1 in active map 118 as shown in step 404. Block driver 124 updates the data D(N) in logical block N in accordance with the I/O transaction in step 406. In step 410 block driver 124 sends a copy of data D(N) to data mover 112 after it is updated. Data mover 112 can batch and send updated data blocks to data mover 144. In step 412 the batched data blocks are sent to data mover 144 with metadata that identify the data blocks by logical block number and their offset within the batch. Data mover 144 and block driver 156 replace data blocks in storage 142 with corresponding data blocks that were sent in step 412. As each data block is replaced in storage 142, data mover 114 sends an acknowledgement to data mover 112. Each acknowledgment identifies the block number N of the data block replaced in target storage 142. In step 416, DRL module 130 updates the active map 118 by setting bit A(N) to logical 0 with each acknowledgment it receives.

Target site 104 may takeover for source site 102 for any one of many different reasons. At takeover, App/VM 152 should be in a state where it can immediately receive, process and properly respond to transaction requests from client computer systems (not shown). During the process of responding to transaction requests App/VM 152 issues I/O transactions for updating the replicated source data 204 within target storage 142. Filter driver 154 taps each of these I/O transactions as they are sent to block driver 156. Filter driver 154 can set bits in the active map 148 corresponding to logical blocks in storage 142 that are updated by I/O transactions from App/VM 152. Periodically, DRL module 162 may clear the bits of active map 148 after the contents of active map 148 are copied to synchronization map 150. In this manner, active map 148 and/or synchronization map 150 track the logical data blocks within the source replica 204 that have been updated since the takeover. Updates to logical data blocks in storage 142 are not replicated back to source storage 110. As a result, the contents of memories 110 and 142 are out of synchronization. Eventually, operations will fallback to source site 102. Before source site 102 can resume responding to transaction requests it receives from client computers systems, however, data source 202 must be synchronized or resynchronized to the contents of the updated replica in target storage 142. The migration process described with reference to FIG. 3 can be used in reverse to synchronize data source 202 to the updated replica in storage 142. The process, including the steps 306-312, may take a substantial amount of time if the contents of the updated replica in storage 142 is large. The present disclosure describes an apparatus and method for shortening the time needed to synchronize the contents of memories 110 and 142 after operations fallback to source site 102. The disclosure takes advantage of the fact that many of the data blocks within source data 202 have not changed during the takeover.

Figure 2B:
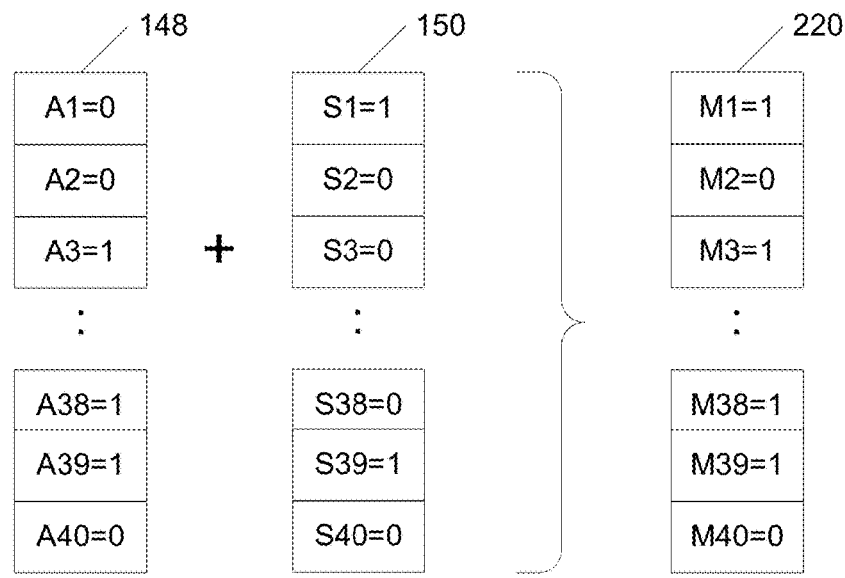
Figure 5:
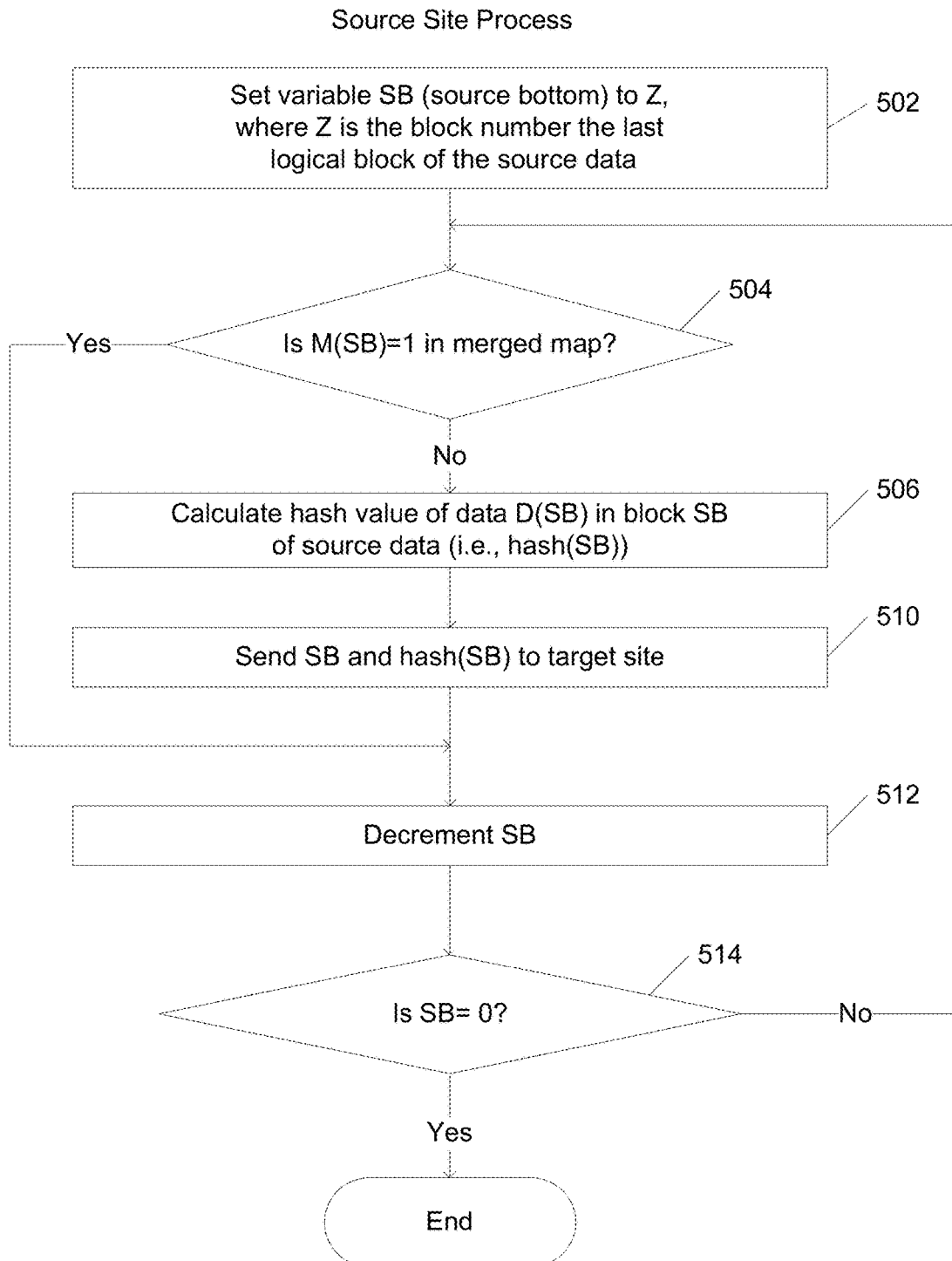
FIG. 5 is a flow diagram illustrating relevant aspects of a process for synchronizing data according to one embodiment of the present disclosure.
Figure 6:
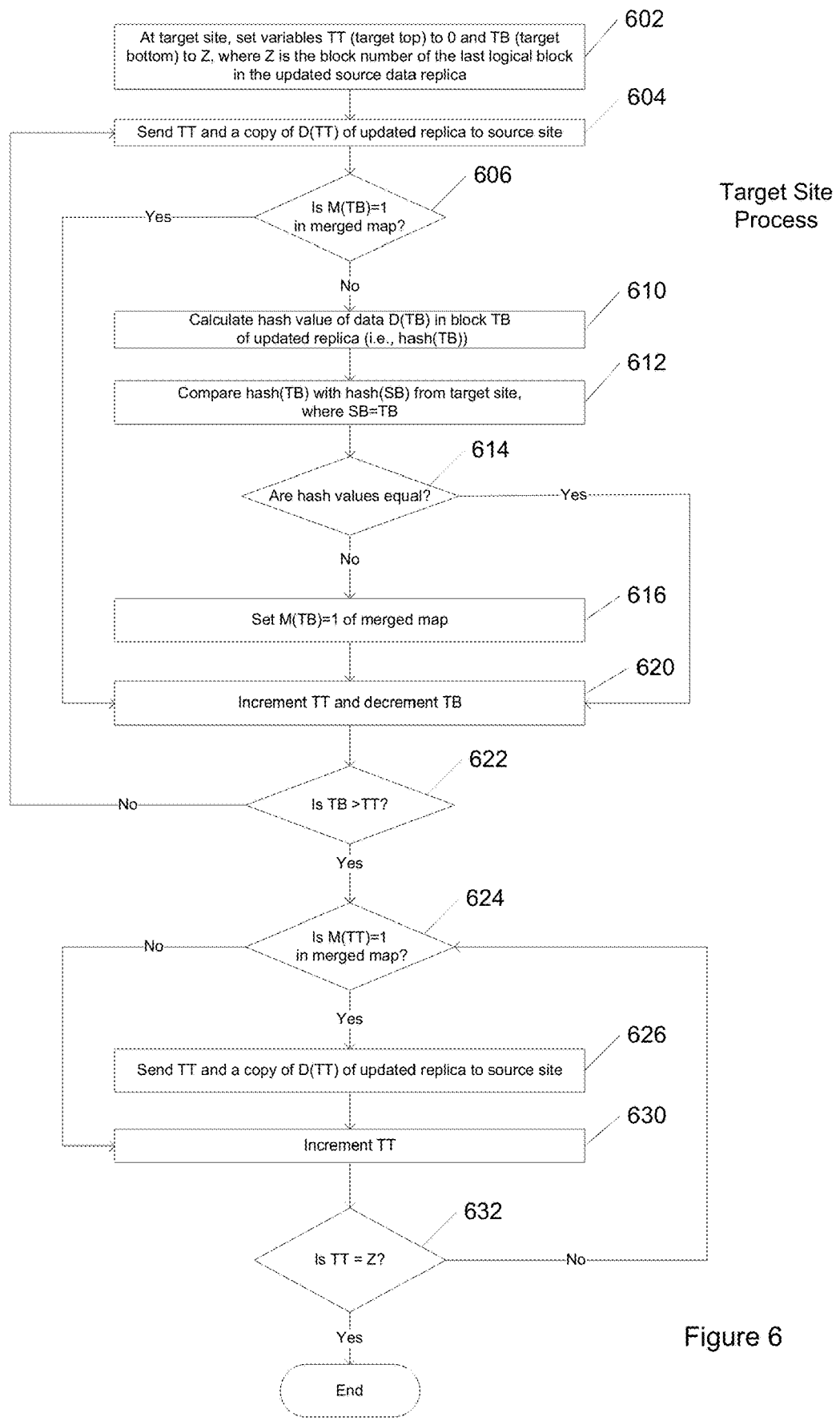
FIG. 6 is a flow diagram illustrating relevant aspects of a process for synchronizing data according to one embodiment of the present disclosure.

FIGS. 5 and 6 illustrate relevant aspects of example processes that could be used to synchronize source data 202 to the updated replica contained within storage 142. Before the processes began, the contents of active map 148 are copied to synchronization map 152 create a merged map. FIG. 2b illustrate an example merged map 220 after example maps 148 and 150 are merged. One or more bits of the merged map are set to indicate those corresponding logical blocks within the updated replica 204 that have been modified since the takeover operation. A copy of the merged map 220 is transmitted to synchronization module 126. The processes shown within FIGS. 5 and 6 start after synchronization module 126 receives the merged map 220, which contains 40 entries corresponding to the 40 logical data blocks contained within the updated replica of storage 142 and the 40 logical data blocks contained in source data of storage 110.

With continuing reference to FIGS. 1, 2a, and 2b, the process of FIG. 5, which is implemented at source site 102, begins with step 502 in which synchronization module 126 sets a variable SB=Z, which in the illustrated example is 40. Synchronization module 126 accesses the merged map 220 it received from target site 104 in order to read bit M(SB). If this bit is set to logical 1, block SB in source data 202 will be replaced with the corresponding block in the updated replica as more fully described below. If this bit is set to logical 0, synchronization module 126 calculates a hash value (e.g., a multibit MD5 value) of the data D(SB) in logical block SB of source data 202 as shown in step 506. Synchronization module 126 then sends to target site 104 the calculated hash value (hash (SB)) and SB, the identity of the corresponding logical block of source data 202. In step 512, synchronization module 126 decrements variable SB. If SB equals 0, the process ends. Otherwise, steps 504-514 are repeated.

The process of FIG. 6 is used to synchronize or resynchronize data source 202 to the updated replica in storage 142. The process is implemented at target site 102 and begins in step 602 when synchronization module 126 sets variables TT=1 and TB=Z, which in the illustrated example is 40. In step 604 synchronization module 160 sends a copy of data D(TT) to the source site 102 along with TT, the number of the logical block in the updated replica that contains data D(TT). Block TT in source data 202 is replaced with data D(TT) sent by target site 104 in step 604. Thereafter, in step 606, synchronization module 160 accesses its merged map 220 to read bit entry M(TB) thereof. If this bit is set to logical 0, synchronization module 160 calculates a hash of data D(TB) within block TB of the updated source replica in storage 142. Target site 104 receives hash values and corresponding identities of logical blocks from source site 102 in accordance with step 510 of FIG. 5. Synchronization module 160 compares hash(TB) with hash(SB) from source site 104 for each SB=TB. In other words target site 104 compares hash values for corresponding logical blocks within source data 202 and the updated replica in storage 142. If these corresponding hash values are equal, the contents of the corresponding logical blocks are equal, and as a result logical block TB within storage 110 need not be synchronized (i.e. replaced) with the contents of corresponding logical block TB within storage 142. If, however, the hash values are not equal as determined by synchronization module 160 in step 614, then synchronization module 160 sets M(TB) to logical 1 in its merged map 220, which ensures that block TB in source data 202 will replaced (i.e. synchronized) with the corresponding block TB of the updated source replica later in the process. In step 620, synchronization module 160 increments variable TT and decrements variable TB if M(TB) is determined to be logical 0 in step 606, or in response to setting M(TB) to logical 1 in step 616. In step 622 synchronization module 160 compares TB to TT. If TB is greater than TT, steps 604-620 are repeated until the point in time when TB exceeds TT. In an alternative embodiment, step 604 through 620 can be divided in concurrently running processes. In other words, target site 104 can: repeatedly implement step 604, and increment TT with each iteration; while repeatedly calculating and comparing hash(TB) with hash(SB) in accordance with step 612, setting M(TB) to logical 1 for those cases in which the hashes are unequal in accordance with step 616, and decrementing TB with each iteration rental TB is greater than TT.

When TB is determined to be greater than TT in step 622, the process proceeds to step 624 where synchronization module 160 accesses its merged map 220 to read the value in M(TT). If this value is set to logical 1, the process proceeds to step 626 where synchronization module 160 sends a copy of the data D(TT) and its identity TT to source site 102. Block TT in source data 202 is replaced with data D(TT) that is sent by target site 104 in step 626. In step 630 synchronization module 160 increments TT. And then in step 632 synchronization module 160 compares TT to Z. If these values are equal to, the process ends and as a result source data 202 should be synchronized or resynchronized to the updated replica at the target site. Otherwise steps 624 through 632 are repeated.

It is noted that the processes of FIGS. 5 and 6 calculate hash values on a block-by-block basis in steps 506 and 610, respectively, and corresponding hash values are compared in step 612 to determine whether the logical data block in source data 202 needs to be resynchronized to its counterpart in the updated replica. In an alternative embodiment, a Merkle tree hash algorithm can be employed to potentially speed the process of re-synchronizing source data 202 to the contents of the updated replica in target site 104. A Merkle tree or hash tree is a tree in which every leaf node is labelled with the hash of a data block, and every non-leaf node is labelled with the hash in the labels of its child nodes. Hash trees allow efficient and secure verification of the contents of large data structures. In the alternative embodiment that employs a hash tree, a tree hash value is calculated for a group of data blocks (e.g., 4 data blocks) in source data 202 that correspond to respective bits in the merged map 220 that are set to logical 0. And a tree hash value is calculated for the corresponding group of data blocks in the updated replica held in storage 142. These two tree hash values are then compared to determine whether the group of data blocks within source data 202 should be resynchronized to the contents of the corresponding group of data blocks, respectively, within the replica. Transmitting a tree hash to target site, which represents the group of data blocks in the data source 102, would replace the transmission of the hash in step 510 of FIG. 5.

An Example Computing and Network Environment

The methods described herein can be implemented using a variety of computing systems (e.g., servers) and networks. Examples of such computing systems and network environments are described below with reference to FIGS. 7 and 8.

Figure 7:
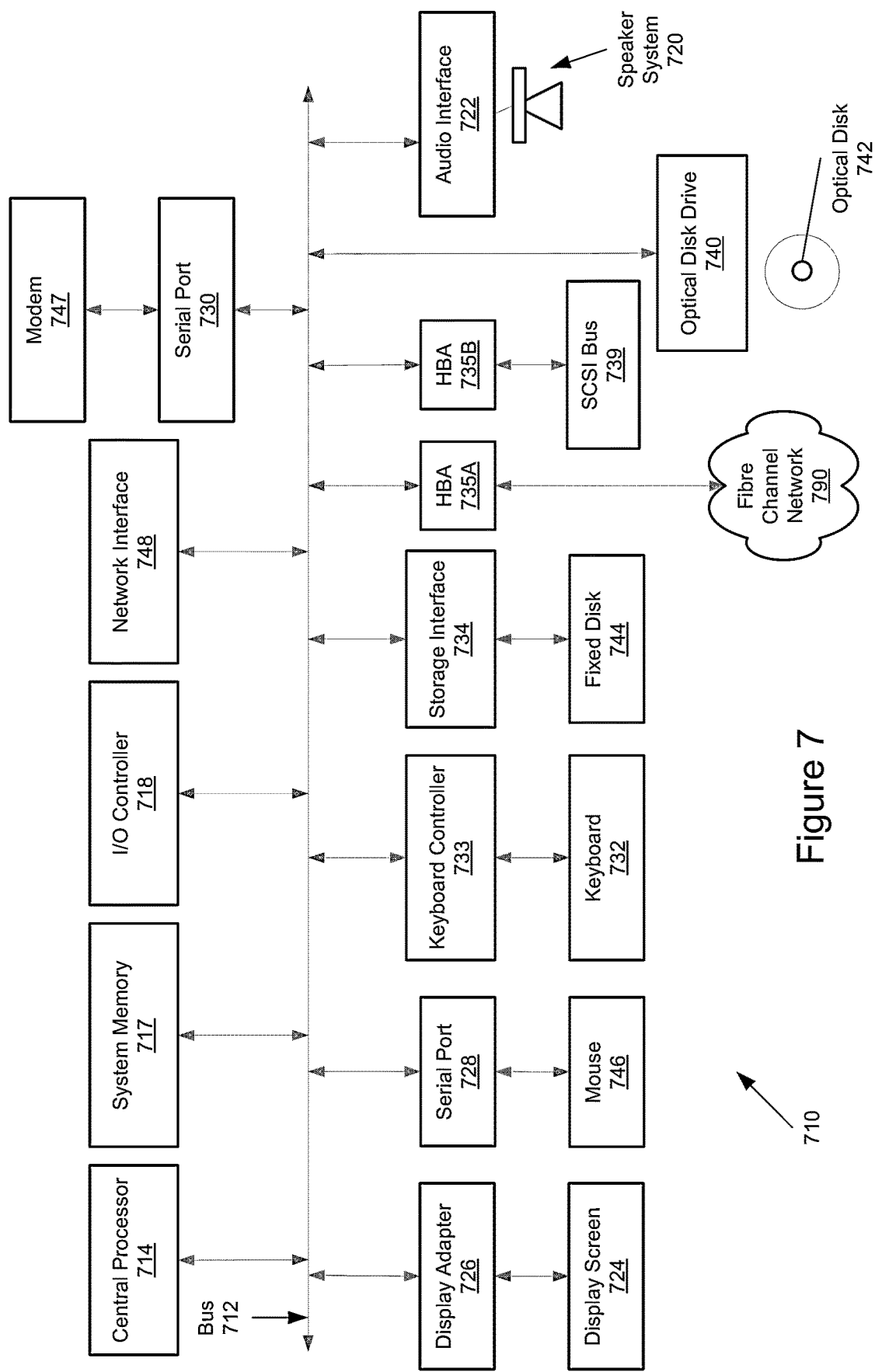
FIG. 7 is a block diagram depicting a computer system suitable for implementing embodiments of methods and systems such as those disclosed herein.

FIG. 7 depicts a block diagram of an example computer system 710 suitable for implementing aspects described herein. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. RAM is generally the main memory into which the operating system and application programs, drivers, and modules like those described above, are loaded. The ROM or flash memory can contain, among other code, the Basic Input-Output System (BIOS) which controls basic hardware operation such as the interaction with peripheral components. Applications, drivers, or modules like those described above, resident with computer system 710 are generally stored on and accessed from a computer-readable storage medium, such as a hard disk drive (e.g., fixed disk 744), an optical drive (e.g., optical drive 740), or other computer-readable storage medium.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via the Internet and an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the systems described herein. The devices and subsystems can be interconnected in different ways from that shown in FIG. 7. The operation of a computer system such as that shown in FIG. 7 is readily known in the art and is not discussed in detail in this application. Code to implement the drivers, modules or applications described herein can be stored in computer-readable storage media such as one or more of system memory 717, fixed disk 744, optical disk 742. The operating system provided on computer system 710 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
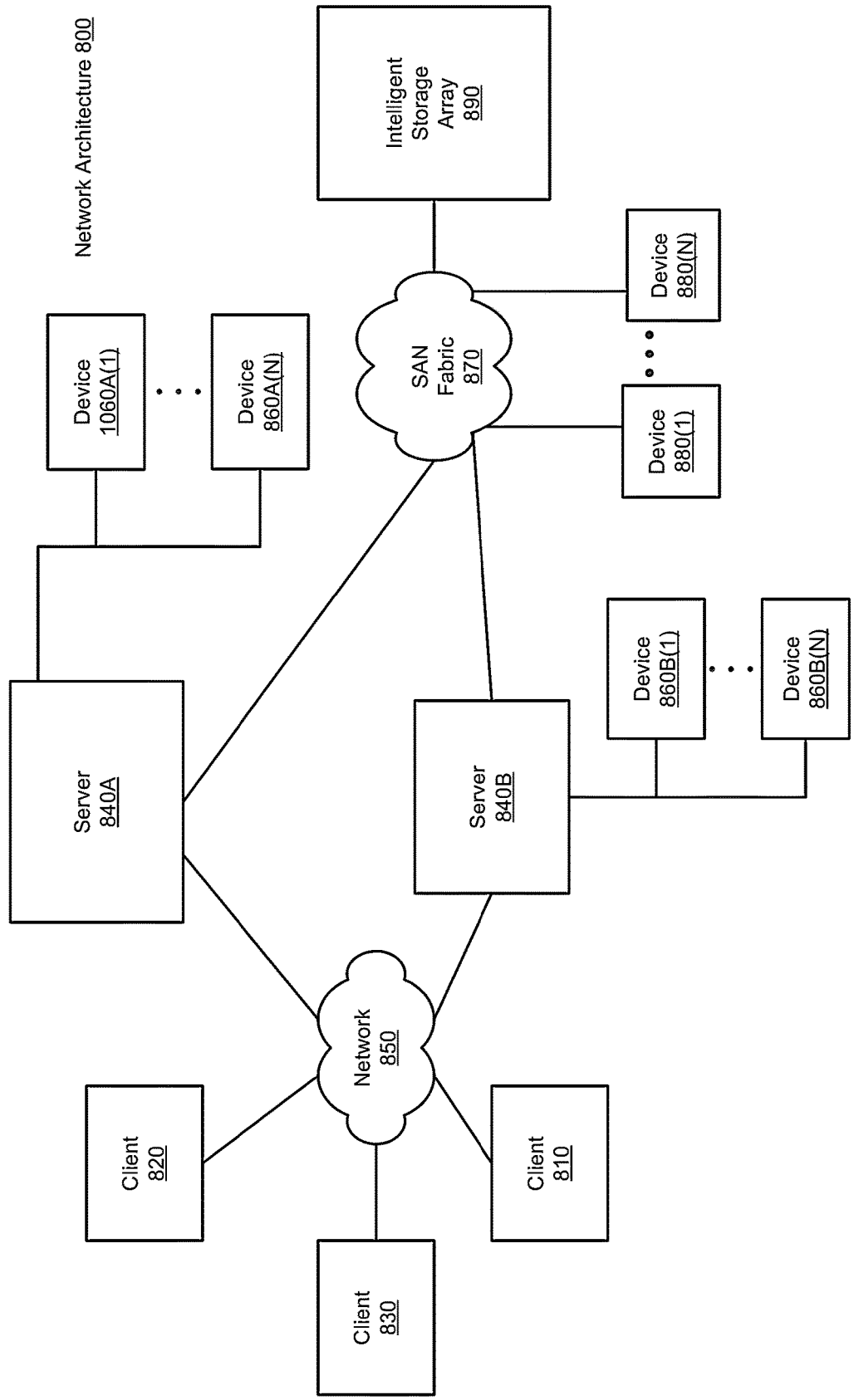
FIG. 8 is a block diagram depicting a network architecture suitable for implementing embodiments of methods and systems such as those disclosed herein.

FIG. 8 is a block diagram depicting a network architecture 800 in which client systems 810, 820 and 830, as well as servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation. SAN fabric 870 supports access to storage devices 880(1)-(N) by servers 840A and 840B, and so by client systems 810, 820 and 830 via network 850. An intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on server 840A or 840B using, for example, a web browser or other client software (not shown). Such a client allows client systems 810, 820 and 830 to access data hosted by server 840A or 840B or one of storage devices 860A(1)-(N), 860B(1)-(N), 880(1)-(N) or intelligent storage array 890. FIG. 8 depicts the use of a network such as the Internet for exchanging data, but the systems described herein are not limited to the Internet or any particular network-based environment.

OTHER EMBODIMENTS

The systems and processes described herein are well adapted to attain the advantages mentioned as well as others inherent therein. While such systems and processes have been depicted, described, and are defined by reference to particular descriptions, such references do not imply a limitation on the claims, and no such limitation is to be inferred. The systems and processes described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components. Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems and methods described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules, or downloaded to one of these devices. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

We claim:

1. A method comprising:
   during a first period of time, sending copies of n data blocks stored in a source memory to a target site via a data link, wherein n is an integer greater than two;
   while sending copies of the n data blocks to the target site, calculating source hashes for some but not all of m data stored in the source memory, wherein m is an integer greater than two, wherein no data blocks are common between the n data blocks and the m data blocks;
   receiving target hashes of data blocks stored in a target memory of the target site;
   comparing the calculated source hashes with respective target hashes;
   during a second period of time, sending copies of only those blocks of the m data blocks to the target site with calculated source hashes, respectively, that do not compare equally to respective target hashes;
   wherein the first and second periods of time are non-overlapping;
   wherein the second period of time is after the first period of time.

2. The method of claim 1 wherein each of the target hashes were calculated for a respective data block of the data blocks stored in the target memory.

3. The method of claim 1 wherein each of the source and target memories store Z contiguous data blocks, wherein m+n=Z.

4. The method of claim 3 wherein the data blocks in the target memory are contiguous with each other.

5. The method of claim 4 wherein the m consecutive data blocks correspond to m consecutive data blocks, respectively, of the target memory.

6. The method of claim 5 further comprising replacing n data blocks of the target memory with the copies of the n consecutive blocks, respectively.

7. A non-transitory computer readable medium (CRM) comprising instructions that are executable on one or more processors to implement a method, the method comprising:
 during a first period of time, sending copies of n data blocks stored in a source memory to a target site via a data link, wherein n is an integer greater than two;
 while sending copies of the n data blocks to the target site, calculating source hashes for some but not all of m data stored in the source memory, wherein m is an integer greater than two, wherein no data blocks are common between the n data blocks and the m data blocks;
 receiving target hashes of data blocks stored in a target memory of the target site;
 comparing the calculated source hashes with respective target hashes;
 during a second period of time, sending copies of only those blocks of the m data blocks to the target site with calculated source hashes, respectively, that do not compare equally to respective target hashes;
 wherein the first and second periods of time are non-overlapping;
 wherein the second period of time is after the first period of time.

8. The non-transitory of claim 7 wherein each of the target hashes were calculated for a respective data block of the data blocks stored in the target memory.

9. The non-transitory CRM of claim 7 wherein each of the source and target memories store Z contiguous data blocks, wherein m+n=Z.

10. The non-transitory CRM of claim 9 wherein the data blocks in the target memory are contiguous with each other.

11. The non-transitory CRM of claim 10 wherein the m consecutive data blocks correspond to m consecutive data blocks, respectively, of the target memory.

12. The non-transitory CRM of claim 11 wherein the method further comprises replacing n data blocks of the target memory with the copies of the n consecutive blocks, respectively.

13. A computer system comprising:
 one or more processors;
 a computer-readable storage medium coupled to the one or more processors; and
 a plurality of instructions, encoded in the computer-readable storage medium, wherein a method is implemented in response to executing the instructions, the method comprising:
  during a first period of time, sending copies of n data blocks stored in a source memory to a target site via a data link, wherein n is an integer greater than two;
  while sending copies of the n data blocks to the target site, calculating source hashes for some but not all of m data stored in the source memory, wherein m is an integer greater than two, wherein no data blocks are common between the n data blocks and the m data blocks;
  receiving target hashes of data blocks stored in a target memory of the target site;
  comparing the calculated source hashes with respective target hashes;
  during a second period of time, sending copies of only those blocks of the m data blocks to the target site with calculated source hashes, respectively, that do not compare equally to respective target hashes;
  wherein the first and second periods of time are non-overlapping;
  wherein the second period of time is after the first period of time.

14. The computer system of claim 13 wherein each of the target hashes were calculated for a respective data block of the data blocks stored in the target memory.

15. The computer system of claim 13,
 wherein each of the source and target memories store Z contiguous data blocks,
 wherein n+m=Z;
  wherein the Z data blocks are contiguous with each other in the target memory;
  wherein the m consecutive data blocks correspond to m data blocks, respectively, of the target memory.

* * * * *